(12) United States Patent
Schlack et al.

(10) Patent No.: US 10,721,621 B2
(45) Date of Patent: Jul. 21, 2020

(54) UPDATING POLICY FOR A VIDEO FLOW DURING TRANSITIONS

(71) Applicant: Cisco Technology, Inc., San Jose, CA (US)

(72) Inventors: John A. Schlack, Quakertown, PA (US); Timothy P. Stammers, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/987,074

(22) Filed: May 23, 2018

(65) Prior Publication Data

US 2019/0364425 A1 Nov. 28, 2019

(51) Int. Cl.

| | |
|---|---|
| *H04W 12/06* | (2009.01) |
| *H04W 12/04* | (2009.01) |
| *H04L 12/813* | (2013.01) |
| *H04L 9/30* | (2006.01) |
| *H04L 9/32* | (2006.01) |
| *H04L 29/06* | (2006.01) |
| *H04N 21/61* | (2011.01) |

(52) U.S. Cl.
CPC ............... *H04W 12/06* (2013.01); *H04L 9/30* (2013.01); *H04L 9/3213* (2013.01); *H04L 9/3247* (2013.01); *H04L 47/20* (2013.01); *H04L 63/0236* (2013.01); *H04L 63/0876* (2013.01); *H04L 65/1083* (2013.01); *H04W 12/04* (2013.01); *H04N 21/6131* (2013.01)

(58) Field of Classification Search
CPC ........ H04W 12/06; H04L 9/30; H04L 9/3213; H04L 9/3247; H04L 47/20; H04L 63/0236
See application file for complete search history.

(56) References Cited

U.S. PATENT DOCUMENTS

| | | | | |
|---|---|---|---|---|
| 2006/0291422 | A1* | 12/2006 | Rochford | H04L 63/0823 370/331 |
| 2007/0249342 | A1* | 10/2007 | Huang | H04L 63/08 455/435.1 |
| 2015/0312255 | A1* | 10/2015 | Libonate | H04L 63/0876 713/168 |
| 2016/0119307 | A1* | 4/2016 | Zollinger | H04L 63/08 726/4 |
| 2017/0141926 | A1* | 5/2017 | Xu | H04L 9/3247 |
| 2017/0295494 | A1* | 10/2017 | Counterman | H04W 12/08 |

* cited by examiner

*Primary Examiner* — Muthuswamy G Manoharan
(74) *Attorney, Agent, or Firm* — Merchant & Gould P.C.

(57) ABSTRACT

First, an authentication module may receive an identification (ID) linking request, create a secured ID linking request from the ID linking request, and send the secured ID linking request to a packet gateway module located in a packet core of a mobile network. Next, the packet gateway module may insert into the secured ID linking request, an encrypted version of a mobile identifier corresponding to a client device from which the secured ID linking request was received. Next, a mobile video session manager module may receive from the packet gateway module, the secured ID linking request and link a subscriber of a managed video service corresponding to a video identifier to the client device corresponding to the mobile identifier. A policy corresponding to the subscriber of the managed video service may then be applied to flows over the packet core to and from the client device.

20 Claims, 3 Drawing Sheets

US 10,721,621 B2

UPDATING POLICY FOR A VIDEO FLOW DURING TRANSITIONS

TECHNICAL FIELD

The present disclosure relates generally to video policy updating.

BACKGROUND

In telecommunication, Long-Term Evolution (LTE) is a standard for high-speed wireless communication for mobile devices and data terminals, based on the GSM/EDGE and UMTS/HSPA technologies. It increases the capacity and speed using a different radio interface together with core network improvements. The standard is developed by the 3GPP (3rd Generation Partnership Project). LTE is the upgrade path for carriers with both GSM/UMTS networks and CDMA2000 networks. The different LTE frequencies and bands used in different countries mean that only multi-band phones are able to use LTE in all countries where it is supported.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
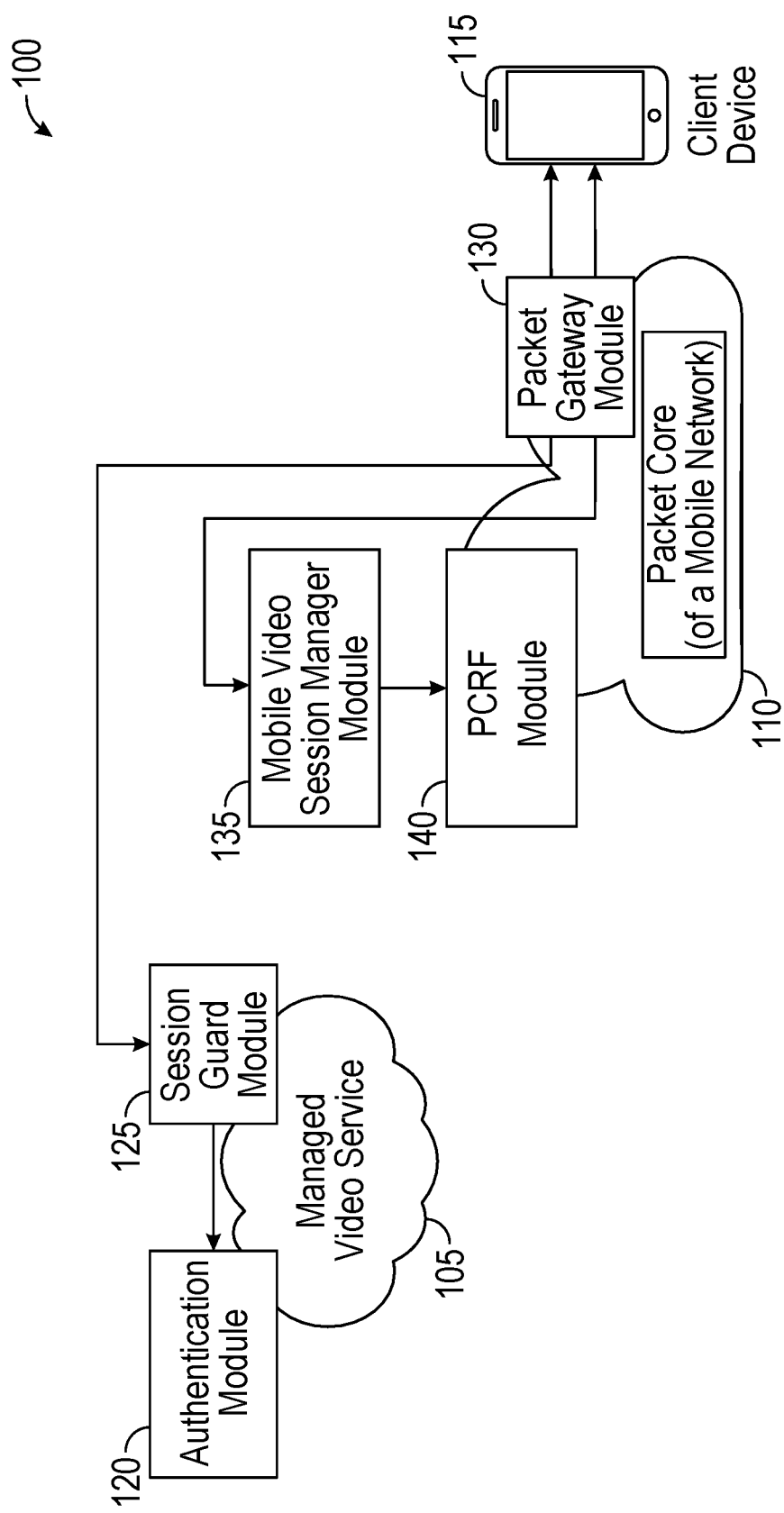
FIG. 1 is a block diagram of a system for providing managed video service.

First, an authentication module may receive an identification (ID) linking request, authenticate the ID linking request from the client device, create a secured ID linking request from the ID linking request, and send the secured ID linking request to a packet gateway module located in a packet core of a mobile network. The ID linking request may include a video identifier corresponding to a subscriber of a managed video service. Next, the packet gateway module may insert into the secured ID linking request, an encrypted version of a mobile identifier corresponding to a client device from which the secured ID linking request was received. Next, a mobile video session manager module may receive from the packet gateway module, the secured ID linking request and link the subscriber of the managed video service corresponding to the video identifier to the client device corresponding to the mobile identifier. A policy corresponding to the subscriber of the managed video service or policy changes due to network transitions may then be applied to flows over the packet core to and from the client device.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Mobile networks (e.g., cellular networks using LTE, 3G, 4G, etc.) and video systems (e.g., that provide managed video service) may use different processes and protocols to identify, for example, client devices and subscribers. For mobile networks, an identifier may comprise an International Mobile Subscriber Identity (IMSI). For video systems, there may be a client device identifier and a household (subscriber) identifier for example. The IMSI, client device identifier, and household identifier may comprise different values. The video system may have no way to discover the IMSI, because application programming interfaces (APIs) to discover the IMSI may not be provided to applications on mobile devices (e.g., handsets) due to privacy concerns. The mobile system may not have a process to discover an ID assigned to devices or households in the video system. In order to assign policies on the mobile network to managed video flows of the video systems, embodiments of the disclosure may establish a link between these identifiers.

Embodiments of the disclosure may provide a managed video service to cable and telecommunications operators. Embodiments of the disclosure may be deployed, for example, to set top boxes and second screen devices, such as mobile phones, tablets, etc. When managed video is delivered over a mobile network, the mobile network operator (MNO) may desire to apply a policy to the mobile network for the video flows. For example, the policy may be zero rating (i.e., not charging data usage for the video), priority for a flow over others on the default bearer, or assignment of a dedicated bearer with potentially a guaranteed bit rate.

In addition, mobile devices may move between different network connections after the video flow is initiated. For example, the user may start out inside a home on a WiFi network with a wireline internet connection and then go outside the home where the client device may use a 4G wireless connection. The opposite may also happen where the video flow may be initiated on a 4G wireless connection and then transitions to a WiFi connection with wireline Internet. As such, the MNO may want the policies applied to the mobile network while the subscriber is connected to the MNO wireless network. However, when the subscriber moves off the MNO wireless network, the MNO may want the policies removed from the mobile network to release network resources and release the packet core from managing the assigned policy. Accordingly, embodiments of the disclosure may allow the video system and mobile application that requested the mobile policy to detect when client devices transition between different network connections.

FIG. 1 is a block diagram of a system 100 for providing managed video. As shown in FIG. 1, system 100 may comprise a managed video service 105, a packet core 110, a client device 115, an authentication module 120, a session guard module 125, a packet gateway module 130, a mobile video session manager module 135, and a policy and charging rules function (PCRF) module 140.

Managed video service 105 may provide a managed service to cable and telecommunications operators. The managed service may comprise Over-The-Top (OTT) media comprising audio, video, and other media services provided directly to a subscriber. A client application (e.g., managed video service application) may be deployed on client device 115 to provide and render the managed video service on client device 115. These video services may be provided on a wired network (e.g., WiFi) or a mobile network (e.g., via cellular network using LTE, 3G, 4G, etc.). When managed video is delivered over the mobile network, a mobile network operator (MNO) that has deployed the managed video service may desire to apply policies to the mobile access network for video flows. These policies for the mobile access network may be congruent with policies desired for the wired network.

In a mobility network, packet core 110 may provide mobility management, session management, and transport for Internet Protocol (IP) packet services. Client device 115 may comprise, but is not limited to, a cable modem, a cellular base station, a tablet device, a mobile device, a smart phone, a telephone, a remote control device, a set-top box, a digital video recorder, a personal computer, a network computer, a mainframe, a router, or other similar microcomputer-based device. Client device 115 may have wireless capability or may be connected to a gateway with wireless capability.

Client device 115, authentication module 120, session guard module 125, packet gateway module 130, mobile video session manager module 135, or PCRF module 140 may be practiced in an electrical circuit comprising discrete electronic elements, packaged or integrated electronic chips containing logic gates, a circuit utilizing a microprocessor, or on a single chip containing electronic elements or microprocessors. Furthermore, client device 115, authentication module 120, session guard module 125, packet gateway module 130, mobile video session manager module 135, or PCRF module 140 may also be practiced using other technologies capable of performing logical operations such as, for example, AND, OR, and NOT, including but not limited to, mechanical, optical, fluidic, and quantum technologies. As described in greater detail below with respect to FIG. 3, client device 115, authentication module 120, session guard module 125, packet gateway module 130, mobile video session manager module 135, or PCRF module 140 may be practiced in a computing device 300. Client device 115, authentication module 120, session guard module 125, packet gateway module 130, mobile video session manager module 135, or PCRF module 140 may comprise different components as shown in FIG. 1 or the functionality of two or more of client device 115, authentication module 120, session guard module 125, packet gateway module 130, mobile video session manager module 135, or PCRF module 140 may be combined into one component consistent with embodiments of the disclosure.

Figure 2:
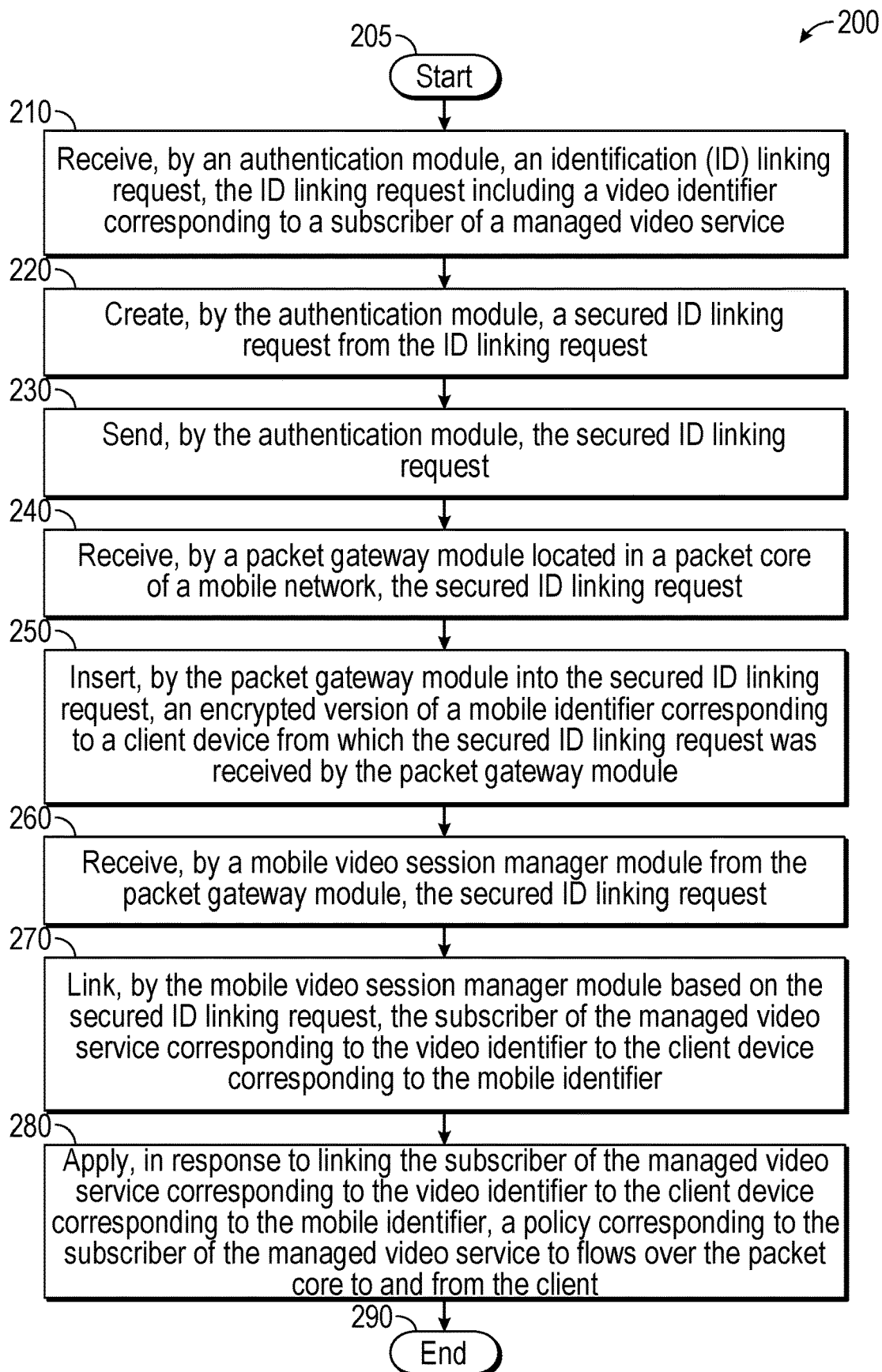
FIG. 2 is a flow chart of a method for providing video policy updates.

FIG. 2 is a flow chart setting forth the general stages involved in a method 200 consistent with an embodiment of the invention for providing video policy updates. Method 200 may be implemented using client device 115, authentication module 120, session guard module 125, packet gateway module 130, mobile video session manager module 135, or PCRF module 140 as described in more detail below. Ways to implement the stages of method 200 will be described in greater detail below.

Method 200 may begin at starting block 205 and proceed to stage 210 where authentication module 120 may receive an identification (ID) linking request, for example, from client device 115. For example, client device 115 may send the ID linking request when a managed video application is initiated on client device 115 or any time client device 115 changes its IP address (e.g., switches from a wired network (e.g., WiFi) to a mobile network (e.g., via cellular network using LTE, 3G, 4G, etc.) or vice versa). The ID linking request may include a video identifier corresponding to a subscriber of managed video service 105. Client device 115 may send the ID linking request to authentication module 120 via Hyper Text Transfer Protocol Secure (HTTPS). Prior to arriving at authentication module 120, the ID linking request may first be received at session guard module 125. Session guard module 125 may verify that the ID linking request came from an authenticated client device (i.e., client device 115). Upon verify that the ID linking request came from an authenticated client device, session guard module 125 may then forward the ID linking request to authentication module 120.

From stage 210, where authentication module 120 receives the ID linking request, method 200 may advance to stage 220 where authentication module 120 may create a secured ID linking request from the ID linking request. For example, authentication module 120 may be deployed in managed video service 105 to perform, for example, the task of building the secured ID linking request (e.g., a secured Hyper Text Transfer Protocol (HTTP) ID linking request). Authentication module 120 may create the secured ID linking request in response to determining that the video identifier from the received ID linking request is associated with a legitimate subscriber of the managed video service provided by managed video service 105.

When creating the secured ID linking request, authentication module 120 may insert into the received ID linking request a URL to send to mobile video session manager module 135 specifying an ID of the managed video service application on client device 115. Authentication module 120 may also add message parameters, for example: i) a token (e.g., a Globally Unique ID (GUID)) for message randomization and to prevent replay attacks; and ii) may specify an expiration date/time (e.g., 30 seconds in the future). Authentication module 120 may sign the secured ID linking request with a hash of these message parameters using a private key.

Once authentication module 120 creates the secured ID linking request in stage 220, method 200 may continue to stage 230 where authentication module 120 may send the secured ID linking request. For example, authentication module 120 may send the secured ID linking request to client device 115, which sent the ID linking request to authentication module 120. Authentication module 120 may send the secured ID linking request to client device 115 via HTTPS.

After authentication module 120 sends the secured ID linking request to client device 115 in stage 230, method 200 may proceed to stage 240 where packet gateway module 130 located in packet core 110 of the mobile network may receive the secured ID linking request from client device 115. For example, having received the secured ID linking request from authentication module 120, client device 115 may send the secured ID linking request to packet gateway module 130. Client device 115 may send the secured ID linking request via HTTP for example.

From stage 240, where packet gateway module 130 receives the secured ID linking request, method 200 may advance to stage 250 where packet gateway module 130 may insert into the secured ID linking request, an encrypted version of a mobile identifier corresponding to client device 115 from which the secured ID linking request was received by packet gateway module 130. For example, the mobile identifier may comprise, but is not limited to, the IMSI of client device 115. Packet gateway module 130 may insert the encrypted mobile identifier (e.g., the encrypted IMSI) of client device 115 into, for example, an HTTP header of the received secured ID linking request and forward the received secured ID linking request to mobile video session manager module 135 that may be deployed in an MNO data center.

Once packet gateway module 130 inserts the encrypted version of the mobile identifier into the secured ID linking request in stage 250, method 200 may continue to stage 260 where mobile video session manager module 135 may receive the secured ID linking request from packet gateway module 130. For example, when mobile video session manager module 135 receives the secured ID linking request, it may validate the signature in the secured ID linking request using the public key, it may verify that the secured ID linking request has not expired, and may verify that the token in the secured ID linking request has not been used before (e.g., for the last 30 seconds). The token verification may be performed by saving the token from a valid request to a data store. The token may be set to be automatically purged from the data store after the expiration, so mobile video session manager module 135 may not need to perform maintenance on the data. In this way, security measures may be taken consistent with embodiments of the disclosure.

The aforementioned security measures may be added by embodiments of the disclosure because HTTP by itself may not be secure. Packet gateway module 130 may insert the encrypted mobile identifier (e.g., the encrypted IMSI) into an HTTP message, but may not be able to insert the encrypted mobile identifier (e.g., the encrypted IMSI) into an HTTPS message because HTPPS is encrypted. Accordingly, HTTPS may not be used between client device 115 and packet gateway module 130 or between packet gateway module 130 and mobile video session manager module 135. However, HTTPS may be used between client device 115 and authentication module 120.

After mobile video session manager module 135 receives the secured ID linking request in stage 260, method 200 may proceed to stage 270 where mobile video session manager module 135 may link, based on the secured ID linking request, the subscriber of managed video service 105 corresponding to the video identifier to client device 115 corresponding to the mobile identifier. For example, the mobile video session manager module 135 may receive the video identifier and the encrypted mobile identifier (e.g., the encrypted IMSI) in the secured ID Link request, thus it may establish the link between the subscriber of managed video service 105 corresponding to the video identifier and client device 115 corresponding to the mobile identifier. Packet gateway module 130 and mobile video session manager module 135 may share encryption keys in order for mobile video session manager module 135 to decrypt the encrypted mobile identifier. Mobile video session manager module 135 may persist the link between the video identifier and the mobile identifier in an internal data store.

From stage 270, where mobile video session manager module 135 links the subscriber of managed video service 105 corresponding to the video identifier to client device 115 corresponding to the mobile identifier, method 200 may advance to stage 280 where PCRF module 140 may apply, in response to mobile video session manager module 135 linking the subscriber of managed video service 105 corresponding to the video identifier to client device 115 corresponding to the mobile identifier, a policy corresponding to the subscriber of managed video service 105 to flows over packet core 110 to and from client device 115. For example, when a policy is applied to video flows, a server in managed video service 105 may send a request to mobile video session manager module 135 to establish the policy. The server in managed video service 105 may identify the target of the policy using the video identifier. Mobile video session manager module 135 may use its data store to map the video identifier to the decrypted mobile identifier (e.g., the decrypted IMSI). Mobile video session manager module 135 may call to PCRF module 140 to assign the policy to the video flow on the mobile network (e.g., packet core 110).

As stated above, the server in managed video service 105 may call into mobile video session manager module 135 to assign policy to a given video flow. The policy, for example, may comprise different charging rules (e.g., such as not charging for data used during managed video delivery), prioritization of the flow among other traffic on that bearer, or establishing a dedicated bearer perhaps even with a guaranteed bit rate. The server in managed video service 105 may also call mobile video session manager module 135 when the video flow ends and policy can be released from the mobile network. Mobile video session manager module 135 may also track video sessions for the duration of the video sessions and the policies that are applied to the video sessions.

The server in managed video service 105 may not know whether client device 115 is on the MNO mobile network or on a different network (e.g., such as in a home WiFi with a wireline connection) at any given time. Even though client device 115 may know whether it is connected to WiFi or wireless, it may not know whether the WiFi connection is routed through the MNO mobile network (e.g., is 5G fixed wireless) or if the wireless connection is the MNO's wireless connection or a 3rd party wireless connection. Thus relying on the managed video service application running on client device 115 to report changes in connection type may not be an accurate process for the server in managed video service 105 to change the policy assignment when transitioning between WiFi and wireless.

Consistent with embodiments of the disclosure, through the ID linking request, mobile video session manager module 135 may know whether a given managed video service client device is connected through the MNO wireless network (e.g., packet core 110). The presence of an encrypted mobile identifier (e.g., encrypted IMSI) in the secured ID linking request sent from the managed video service application running on client device 115 to mobile video session manager module 135 may signal that the secured ID linking request flowed through packet gateway module 130 on the MNO mobile network. Because packet gateway module 130 may be configured to insert the encrypted mobile identifier (e.g., encrypted IMSI) into the secured ID linking request, the absence of the encrypted mobile identifier in the secured ID linking request may signal to mobile video session manager module 135 that the managed video service application running on client device 115 may not be connected through the MNO mobile network (i.e., packet core 110).

In order for mobile video session manager module 135 to detect these network transitions, the managed video service application running on client device 115 may send the secured ID linking request when the managed video service application running on client device 115 launches and each time the IP address changes on client device 115. This may ensure that mobile video session manager module 135 may receive up-to-date details about whether client device 115 may be on or off the MNO mobile network (i.e., packet core 110).

Because mobile video session manager module 135 may keep track of active video sessions for managed video service applications running on client devices, tracks mobile policies to apply for those active video sessions, may know whether the client devices are connected to the MNO mobile network at any given time, and may receive notifications (ID link requests) when connection states changes, mobile video session manager module 135 may apply and remove policies on the mobile access network based on these WiFi and wireless transitions. Once PCRF module 140 applies the policy in stage 280, method 200 may then end at stage 290.

Figure 3:
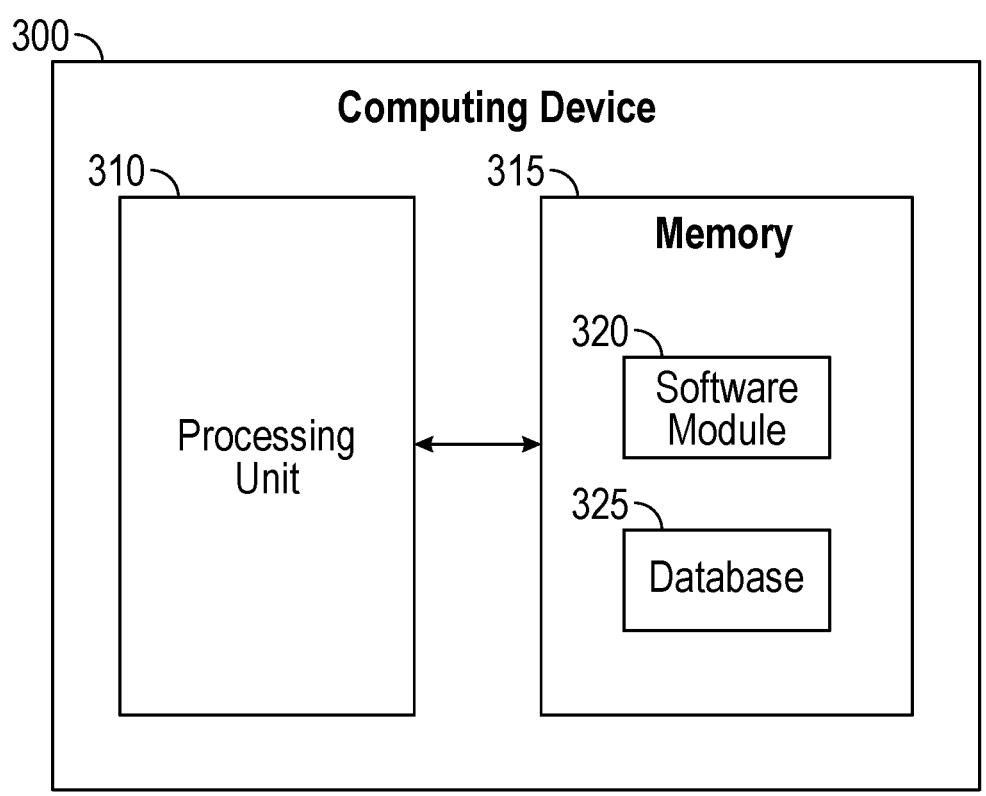
FIG. 3 is a block diagram of a computing device.

FIG. 3 shows computing device 300. As shown in FIG. 3, computing device 300 may include a processing unit 310 and a memory unit 315. Memory unit 315 may include a software module 320 and a database 325. While executing on processing unit 310, software module 320 may perform, for example, processes for providing video policy updates, including for example, any one or more of the stages from method 200 described above with respect to FIG. 2. Computing device 300, for example, may provide an operating environment for client device 115, authentication module 120, session guard module 125, packet gateway module 130, mobile video session manager module 135, or PCRF module 140. Client device 115, authentication module 120, session guard module 125, packet gateway module 130, mobile video session manager module 135, and PCRF module 140 may operate in other environments and are not limited to computing device 300.

Computing device 300 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 300 may comprise any computer operating environment, such as hand-held devices, multiprocessor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 300 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
 receiving, by a packet gateway module located in a packet core of a mobile network, a secured identification (ID) linking request, wherein receiving the secured ID linking request comprises receiving the secured ID linking request in response to:
  receiving, by an authentication module, an ID linking request from a client device;
  creating, by the authentication module, the secured ID linking request from the ID linking request by inserting into the ID linking request a plurality of message parameters comprising a token and an expiration date to the ID linking request,
  signing, by the authentication module, the ID linking request with a hash of the plurality of message parameters using a private key to create the secured ID linking request, and
  sending, by the authentication module, the secured ID linking request to the client device;
 inserting, by the packet gateway module into the secured ID linking request, an encrypted version of a mobile identifier corresponding to the client device from which the secured ID linking request was received by the packet gateway module;
 receiving, by a mobile video session manager module from the packet gateway module, the secured ID linking request;
 verifying, by the mobile video session manager module, that the secured ID linking request has not expired;
 linking, by the mobile video session manager module in response to verifying the secured ID linking request, a subscriber of a managed video service corresponding to a video identifier to the client device corresponding to the mobile identifier; and
 applying, in response to linking the subscriber of the managed video service, a policy corresponding to the subscriber of the managed video service to flows over the packet core to and from the client device.

2. The method of claim 1, wherein receiving, by the packet gateway module, the secured ID linking request comprises receiving the secured ID linking request from the client device.

3. The method of claim 1,
 wherein the ID linking request comprises the video identifier corresponding to the subscriber of the managed video service.

4. The method of claim 1, wherein receiving the ID linking request comprises receiving the ID linking request via Hyper Text Transfer Protocol Secure (HTTPS).

5. The method of claim 1, wherein sending the secured ID linking request comprises sending the secured ID linking request via Hyper Text Transfer Protocol Secure (HTTPS).

6. The method of claim 1, further comprising, in response to receiving the secured ID linking request from the packet gateway module:
 validating, by the mobile video session manager module, a signature from the secured ID linking request using a public key;
 and
 verifying, by the mobile video session manager module, that the token from the secured ID linking request has not been used before.

7. The method of claim 1, wherein inserting the encrypted version of the mobile identifier corresponding to the client device comprises inserting the encrypted version of the mobile identifier corresponding to the client device comprising a mobile device.

8. The method of claim 1, wherein inserting the encrypted version of the mobile identifier comprises inserting the encrypted version of the mobile identifier comprising an International Mobile Subscriber Identity (IMSI) associated with the client device.

9. The method of claim 1, wherein inserting the encrypted version of the mobile identifier comprises inserting the encrypted version of the mobile identifier into a Hyper Text Transfer Protocol (HTTP) header of the secured ID linking request.

10. A system comprising:
 a memory storage; and
 a processing unit coupled to the memory storage, wherein the processing unit is operative to:
  receive, from the packet gateway module, a secured ID linking request, wherein the processing unit being operative to receive the secured ID linking request comprising the processing unit being operative to receive the secured ID linking request in response to the processing unit being operative to cause an authentication module to:
   receive an ID linking request from a client device;
   create the secured ID linking request from the ID linking request by inserting into the ID linking request a plurality of message parameters comprising a token and an expiration date to the ID linking request,
   sign the ID linking request with a hash of the plurality of message parameters using a private key to create the secured ID linking request, and
   send the secured ID linking request to the client device, wherein the packet gateway module receives the secured ID linking request from the client device and insert, into the secured ID linking request, an encrypted version of a mobile identifier corresponding to the client device from which the secured ID linking request was received;
  verify that the secured ID linking request has not expired;
  link, upon verifying the secured ID linking request, a subscriber of a managed video service corresponding to a video identifier to the client device corresponding to a mobile identifier; and
  apply a policy corresponding to the subscriber of the managed video service to flows over the packet core to and from the client device.

11. The system of claim 10, wherein the processing unit is further operative to, in response to receiving the secured ID linking request:
 validate a signature from the secured ID linking request using a public key;
 and
 verify that the token from the secured ID linking request has not been used before.

12. The system of claim 10, wherein the client device comprises a mobile device.

13. The system of claim 10, wherein the mobile identifier comprises an International Mobile Subscriber Identity (IMSI) associated with the client device.

14. The system of claim 10, wherein the secured ID linking request is sent via Hyper Text Transfer Protocol Secure (HTTPS).

15. The system of claim 10, wherein the encrypted version of the mobile identifier is inserted into a Hyper Text Transfer Protocol (HTTP) header of the secured ID linking request.

16. A non-transitory computer-readable medium that stores a set of instructions which when executed perform a method comprising:
   receiving, by a packet gateway module located in a packet core of a mobile network, a secured ID linking request, wherein receiving the secured ID linking request comprises receiving the secured ID linking request in response to:
      receiving, by an authentication module, an ID linking request from a client device;
      creating, by the authentication module, the secured ID linking request from the ID linking request by inserting into the ID linking request a plurality of message parameters comprising a token and an expiration date to the ID linking request,
      signing, by the authentication module, the ID linking request with a hash of the plurality of message parameters using a private key to create the secured ID linking request, and
      sending, by the authentication module, the secured ID linking request to the client device;
   inserting, by the packet gateway module into the secured ID linking request, an encrypted version of a mobile identifier corresponding to the client device;
   verifying, by a mobile video session manager module, that the secured ID linking request has not expired;
   linking, by the mobile video session manager module in response to verifying the secured ID linking request, a subscriber of a managed video service corresponding to a video identifier to the client device corresponding to the mobile identifier; and
   applying, in response to linking the subscriber of the managed video service corresponding to the video identifier to the client device corresponding to the mobile identifier, a policy corresponding to the subscriber of the managed video service to flows over the packet core to and from the client device.

17. The non-transitory computer-readable medium of claim 16, wherein receiving the secured ID linking request comprises receiving the secured ID linking request from the client device.

18. The non-transitory computer-readable medium of claim 16, wherein inserting the encrypted version of the mobile identifier corresponding to the client device comprises inserting the encrypted version of the mobile identifier corresponding to the client device comprising a mobile device.

19. The non-transitory computer-readable medium of claim 16, wherein inserting the encrypted version of the mobile identifier comprises inserting the encrypted version of the mobile identifier comprising an International Mobile Subscriber Identity (IMSI) associated with the client device.

20. The non-transitory computer-readable medium of claim 16, wherein inserting the encrypted version of the mobile identifier comprises inserting the encrypted version of the mobile identifier into a Hyper Text Transfer Protocol (HTTP) header of the secured ID linking request.

* * * * *